(12) United States Patent
Green et al.

(10) Patent No.: US 11,468,341 B2
(45) Date of Patent: Oct. 11, 2022

(54) SYSTEMS AND METHODS FOR BELIEF LEARNING

(71) Applicant: Meta Platforms, Inc., Menlo Park, CA (US)

(72) Inventors: Bradley Ray Green, Snohomish, WA (US); Deepak Chinavle, Kirkland, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 1163 days.

(21) Appl. No.: 15/986,074

(22) Filed: May 22, 2018

(65) Prior Publication Data

US 2019/0362244 A1   Nov. 28, 2019

(51) Int. Cl.
*G06N 5/02*   (2006.01)
*G06Q 50/00*   (2012.01)
*H04L 67/50*   (2022.01)

(52) U.S. Cl.
CPC ............. *G06N 5/025* (2013.01); *G06Q 50/01* (2013.01); *H04L 67/535* (2022.05)

(58) Field of Classification Search
CPC ......... G06N 5/025; G06Q 50/01; H04L 67/22
See application file for complete search history.

(56) References Cited

U.S. PATENT DOCUMENTS

| | | | |
|---|---|---|---|
| 2013/0158984 A1* | 6/2013 | Myslinski | G06F 16/951 704/9 |
| 2016/0134692 A1* | 5/2016 | Ju | H04W 4/08 709/204 |
| 2016/0378758 A1* | 12/2016 | Green | G06Q 50/01 707/734 |
| 2017/0116244 A1* | 4/2017 | McKenna | G06F 16/2246 |

* cited by examiner

*Primary Examiner* — Robert G Bachner
(74) *Attorney, Agent, or Firm* — Sheppard Mullin Richter & Hampton LLP (57) ABSTRACT

Systems, methods, and non-transitory computer readable media are configured to determine an interaction between a first entity and a first item. A second entity can be determined. The first entity can have formed a connection with the second entity on a social networking system. A belief that the second entity will interact with the first item can then be generated.

20 Claims, 7 Drawing Sheets

SYSTEMS AND METHODS FOR BELIEF LEARNING

FIELD OF THE INVENTION

The present technology relates to computerized social networking systems. More particularly, the present technology relates to techniques for learning beliefs within computerized social networking systems.

BACKGROUND

Users often utilize computing devices for a wide variety of purposes. For example, users of a social networking system can use their computing devices to communicate with other users of the social networking system. The users can also use their computing devices to access pages on the social networking system. The social networking system can have a multitude of users and a multitude of pages. As such, a user can have many choices in terms of other users with whom to communicate. Likewise, the user can have many choices in terms of pages to access.

SUMMARY

Various embodiments of the present technology can include systems, methods, and non-transitory computer readable media configured to determine an interaction between a first entity and a first item. A second entity can be determined. The first entity can have formed a connection with the second entity on a social networking system. A belief that the second entity will interact with the first item can then be generated.

In an embodiment, the first entity can be a first user.

In an embodiment, the second entity can be a second user.

In an embodiment, the first item can be recommended to the second entity.

In an embodiment, the belief can be compared to a threshold.

In an embodiment, the generating the belief that the second entity will interact with the first item can be based on a similarity between the first entity and the second entity.

In an embodiment, the generating the belief that the second entity will interact with the first item can be based on an existing belief that the second entity will interact with the first item.

In an embodiment, the interaction between the first entity and the first item can be recorded.

In an embodiment, the interaction between the first entity and the first item can be recorded in a Bloom filter.

In an embodiment, the interaction between the first entity and the first item can be recorded in a list.

In an embodiment, the interaction between the first entity and the first item can be determined to be a liking of a page.

In an embodiment, the interaction between the first entity and the first item can be determined to be a friending of a third entity.

In an embodiment, the third entity can be a user.

In an embodiment the interaction between the first entity and the first item can be a posting of inaccurate content. Also, the first entity can be a first page and the second entity can be a second page. Further, the second page can be determined to have a potential to post inaccurate content.

In an embodiment, a belief that the second entity will interact with a second item can be generated.

In an embodiment, the generating the belief that the second entity will interact with the second item can be based on an existing belief that the first entity will interact with the second item.

In an embodiment, the generating the belief that the second entity will interact with the second item can be performed when generating the belief that the second entity will interact with the first item.

In an embodiment, the generating the belief that the second entity will interact with the second item can be performed as a periodic operation.

It should be appreciated that many other features, applications, embodiments, and/or variations of the present technology will be apparent from the accompanying drawings and from the following detailed description. Additional and/or alternative implementations of the structures, systems, non-transitory computer readable media, and methods described herein can be employed without departing from the principles of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Belief Learning

Users often utilize computing devices for a wide variety of purposes. For example, users of a social networking system can use their computing devices to communicate with other users of the social networking system. The users can also use their computing devices to access pages on the social networking system. The social networking system can have a multitude of users and a multitude of pages. As such, a user can have many choices in terms of other users with whom to communicate. Likewise, the user can have many choices in terms of pages to access.

The multitude of users and pages offered by a social networking system can provide interactions that enrich the experience of the user on the social networking system. However, the user can be unsure of the users and pages with which to interact. As such, the social networking system can suggest certain users and pages to the user. For example, according to some conventional approaches, the social networking system can suggest users similar to users with whom the user has communicated in the past. Likewise, according to certain conventional approaches, the social networking system can suggest pages similar to pages that the user has accessed in the past. There can be users on the social networking system who are friends of the user on the social networking system. These friends of the user can have friended other users on the social networking system. Likewise, these friends of the user can have "liked" various pages on the social networking system. The other users can be potentially suggested as new friends for the user. Likewise, the "likes" can potentially suggest new pages for the user. However, conventional computerized approaches do not typically fully take advantage of this information to optimize interactions of the user on the social networking system.

Due to these or other concerns, the aforementioned and other conventional approaches specifically arising in the realm of computer technology can be disadvantageous or problematic. Therefore, an improved approach can be beneficial for addressing or alleviating various drawbacks associated with conventional approaches. Based on computer technology, the present technology can generate a belief that a first user will interact with an item on a social networking system. The belief can be a likelihood or probability. Generation of the belief can involve a second user who has previously friended (or formed a connection with) the first user on the social networking system. In some embodiments, the belief can be generated based on interaction of the second user with the item. Knowledge of the interaction of the second user with the item can be propagated to and associated with the first user as the belief that the first user will interact with the item. The generation of the belief can be based on a similarity between the first user and the second user. As one example, the item can be a page on the social networking system. In this example, the generated belief can be a belief that the first user will like (or otherwise express positive sentiment for) the page. As another example, the item can be a third user on the social networking system. In this example, the generated belief can be a belief that the first user will friend (or form a connection with) the third user. Where, for instance, the generated belief meets a threshold (or threshold value), the item can be recommended to the first user.

In various embodiments discussed herein, generation of a belief is sometimes referenced in relation to generating a belief that a user will interact. However, the present technology applies equally to generating a belief that an entity other than a user will interact. In some embodiments, the entity can instead be a page. For example, a belief can be generated that a first page will friend a third page on the social networking system. In some embodiments, a second page can be a page which has previously friended the first page, and the belief can be generated based on the second page friending the third page. In this example, where the generated belief meets a threshold (or threshold value), the third page can be recommended to the first page. In some embodiments, a friending of a page by another page can be termed a "liking" (or "like").

The present technology is, in various embodiments, sometimes discussed in terms of: 1) an item which is a user or a page; and 2) an interaction which is a friending or a liking. However, the present technology can be more generally applied. In some embodiments, the item also can be content and the interaction also can be posting or following. Many variations are possible. For example, a belief can be generated that a first page will post given content (or content similar to the given content). In this example, a second page can be a page which has friended the first page, and the belief can be generated based on the second page posting the given content. Continuing with this example, where the generated belief meets a threshold (or threshold value), the social networking system can consider it likely that the first page will post the given content (or content similar to the given content). As just one implementation, where the given content is inaccurate, or the second page has a tendency to post inaccurate content, the social networking system can consider it possible that the first page can have a potential to post inaccurate content. More details regarding the present technology are provided herein.

Figure 1:
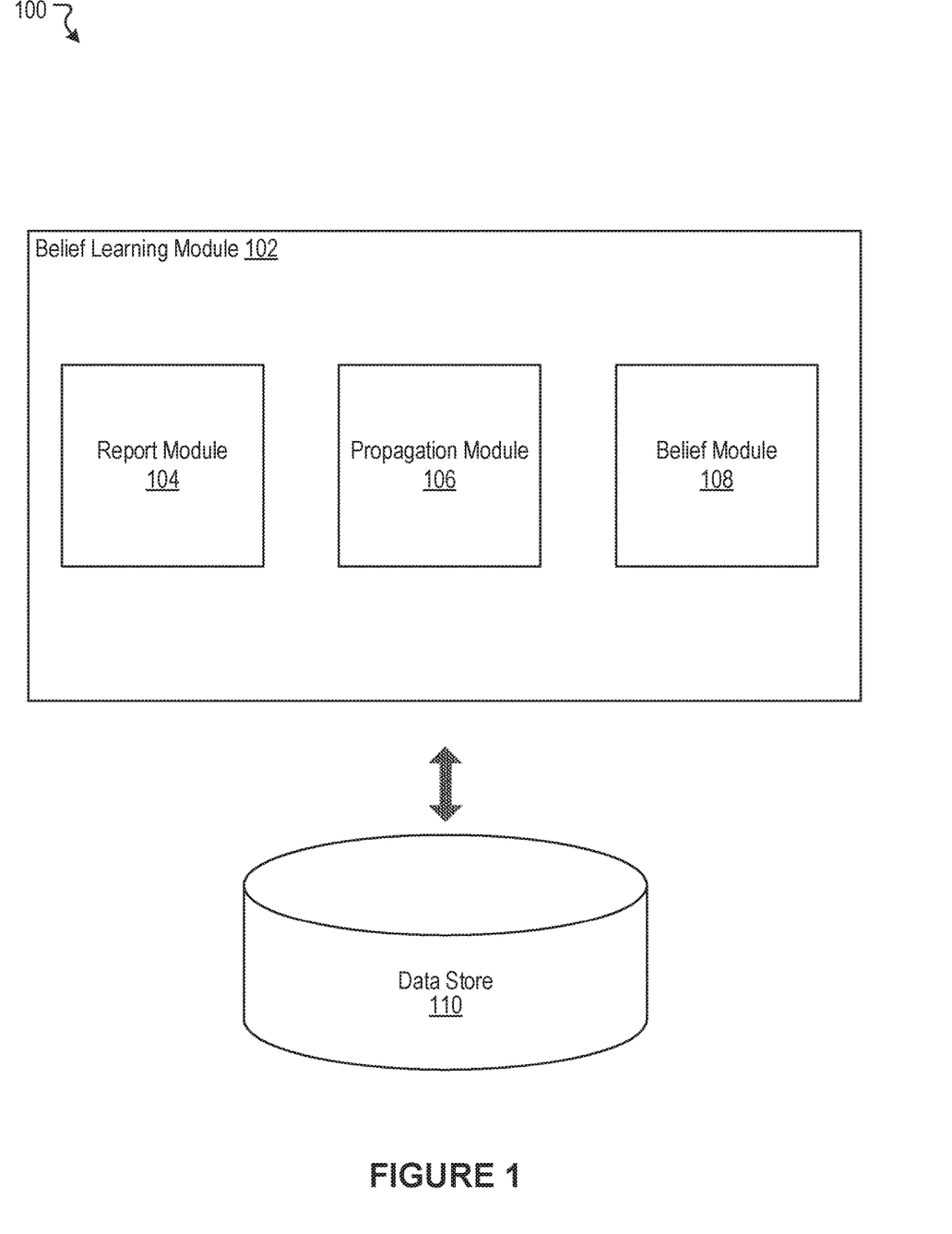
FIG. 1 illustrates an example system including an example belief learning module, according to an embodiment of the present technology.

FIG. 1 illustrates an example system 100 including an example belief learning module 102, according to an embodiment of the present technology. As referenced above, the belief learning module 102 can generate a belief that a user will interact with an item on a social networking system. As shown in the example of FIG. 1, the belief learning module 102 can include a report module 104, a propagation module 106, and a belief module 108. In some instances, the example system 100 can include at least one data store 110. The components (e.g., modules, elements, etc.) shown in this figure and all figures herein are exemplary only, and other implementations can include additional, fewer, integrated, or different components. Some components may not be shown so as not to obscure relevant details. In some embodiments, the belief learning module 102 can be implemented in a system, such as a social networking system. While the present technology may be described herein in connection with a social networking system for illustrative purposes, the present technology can be implemented in any other type of system or environment.

In some embodiments, the belief learning module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the belief learning module 102 can be implemented, in part or in whole, as software running on one or more computing devices or systems. For example, the belief learning module 102 or at least a portion thereof can be implemented using one or more computing devices or systems that include one or more servers, such as network servers or cloud servers. In another example, the belief learning module 102 or at least a portion thereof can be implemented as or within an application (e.g., app), a program, an applet, or an operating system, etc., running on a user computing device or a client computing system, such as a user device 610 of FIG. 6. In some instances, the belief learning module 102 can, in part or in whole, be implemented within or configured to operate in conjunction with a system (or service), such as a social networking system 630 of FIG. 6. The application incorporating or implementing instructions for performing functionality of the belief learning module 102 can be created by a developer. The application can be provided to or maintained in a repository. In some cases, the application can be uploaded or otherwise transmitted over a network (e.g., Internet) to the repository. For example, a computing system (e.g., server) associated with or under control of the developer of the application can provide or transmit the application to the repository. The repository can include, for example, an "app" store in which the application can be maintained for access or download by a user. In response to a command by the user to download the application, the application can be provided or otherwise transmitted over a network from the repository to a computing device associated with the user. For example, a computing system (e.g., server) associated with or under control of an administrator of the repository can cause or permit the application to be transmitted to the computing device of the user so that the user can install and run the application. The developer of the application and the administrator of the repository can be different entities in some cases, but can be the same entity in other cases. It should be understood that there can be many variations or other possibilities.

The belief learning module 102 can be configured to communicate and/or operate with the at least one data store 110, as shown in the example system 100. The at least one data store 110 can be configured to store and maintain various types of data. For example, the data store 110 can store information used or generated by the belief learning module 102. The information used or generated by the belief learning module 102 can include, for example, friending data, liking data, and belief data. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user specified settings, content produced or posted by users, and various other types of user data.

The report module 104 can record or log information regarding an interaction of a user with an item on the social networking system. The item can be, for example, a page or another user. The interaction can be, for example, a liking or a friending. The report module 104 can also provide previously-recorded information regarding an interaction of a user. Additional details regarding the report module 104 are provided below with reference to FIG. 2.

The propagation module 106 can generate a belief that a user will interact with an item on the social networking system. The propagation module 106 can also provide a previously-generated belief. Additional details regarding the propagation module 106 are provided below with reference to FIG. 3.

The belief module 108 can become aware of an interaction of a user with an item. In response to becoming aware of the interaction, the belief module 108 can determine whether the interaction is, for example, a liking or a friending. Where the item is a page, the belief module 108 can determine the interaction to be a liking. Where the item is another user, the belief module 108 can determine the interaction to be a friending.

Where the interaction is a liking, the belief module 108 can use the report module 104 to determine whether information has been previously recorded regarding the liking. Likewise, where the interaction is a friending, the belief module 108 can use the report module 104 to determine whether information has been previously recorded regarding the friending. Where the belief module 108 determines that information has previously been recorded regarding the liking or friending, the belief module 108 does not perform further operations with respect to the liking or friending. Where the belief module 108 determines that information has not been previously recorded regarding the liking or friending, the belief module 108 can perform further operations with respect to the liking or friending.

In particular, where the interaction is a liking, the belief module 108 can use the report module 104 to record the liking. Similarly, where the interaction is a friending, the belief module 108 can use the report module 104 to record the friending. Under either circumstance, the belief module 108 can use the report module 104 to receive previously-recorded information regarding friendings of the user. As such, the belief module 108 can receive information regarding other users who have been friended by the user in the past. The belief module 108 can use the propagation module 106 to generate beliefs for each of the other users. As such, knowledge of the interaction can be propagated to the other users as beliefs that the other users will perform the same interaction.

As an example, the interaction of which the belief module 108 becomes aware can be a liking of a page. In this example, the belief module 108 can use the propagation module 106 to generate, for each of the other users, a belief that the other user will like the page. In some embodiments, when using the propagation module 106 to generate these beliefs, the belief module 108 can also use the propagation module 106 to generate additional beliefs. The additional beliefs can be beliefs that the other users will like various further pages of the social networking system. The various further pages can be pages for which there are previously-generated beliefs. The previously-generated beliefs can be beliefs that the user, who performed the interaction of which the belief module 108 became aware, will like the further pages. As such, the previously-generated beliefs can be propagated to the other users as beliefs that the other users will like the further pages.

As another example, the interaction of which the belief module 108 becomes aware can be a friending of a given user. In this example the belief module 108 can use the propagation module 106 to generate, for each of the other users, a belief that the other user will friend the given user. In some embodiments, when using the propagation module 106 to generate these beliefs, the belief module 108 can also use the propagation module 106 to generate additional beliefs. The additional beliefs can be beliefs that the other users will friend various further users of the social networking system. The various further users can be users for which there are previously-generated beliefs. The previously-generated beliefs can be beliefs that the user, who performed the interaction of which the belief module 108 became aware, will friend the further users. As such, the previously-generated beliefs can be propagated to the other users as beliefs that the other users will friend the further users.

Moreover, the belief module 108 can use the propagation module 106 to access a previously-generated belief regarding an interaction between a given user and a given item to make recommendations. As an example, the belief module 108 can use the propagation module 106 to access a previously-generated belief that a given user will like a given page. In this example, the belief module 108 can use the previously-generated belief in providing page recommendations to the given user. As an illustration, the belief module 108 can recommend the given page where the belief meets a threshold (or threshold value). As another example, the belief module 108 can use the propagation module 106 to access a previously-generated belief that a first user will friend a second user. In this example, the belief module 108 can use the previously-generated belief in providing friend recommendations to the first user. As an illustration, the belief module 108 can recommend the second user as a potential friend where the belief meets a threshold (or threshold value).

Figure 2:
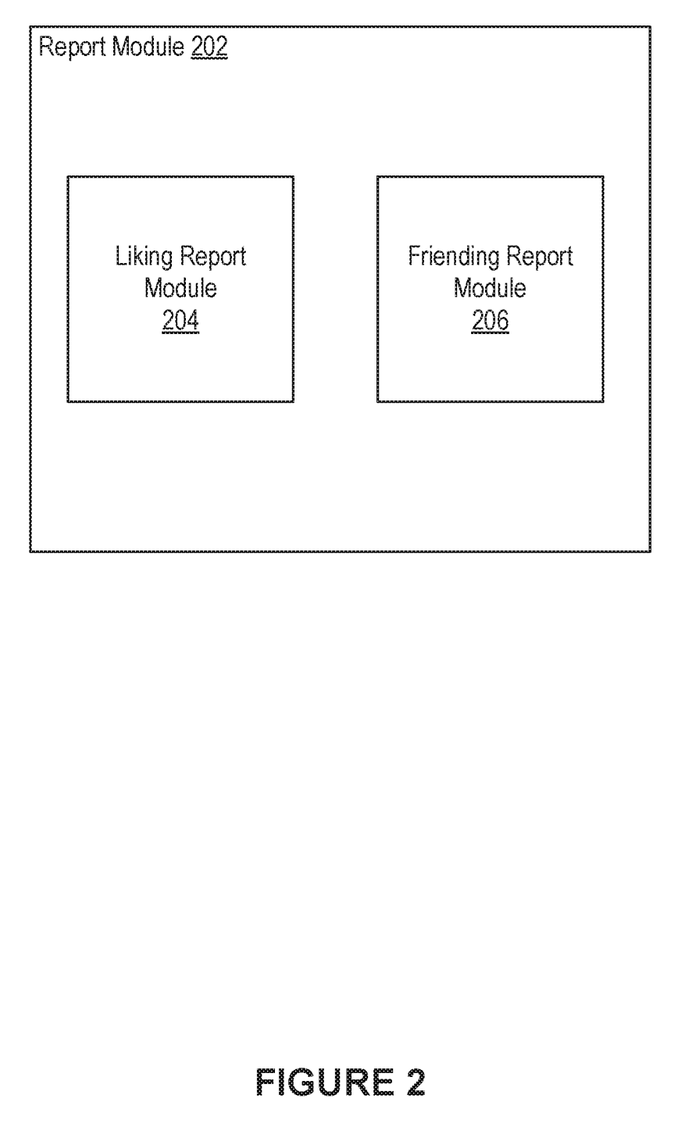
FIG. 2 illustrates an example report module, according to an embodiment of the present technology.

FIG. 2 illustrates an example report module 202, according to an embodiment of the present technology. In some embodiments, the report module 104 of FIG. 1 can be implemented as the example report module 202. As shown in FIG. 2, the report module 202 can include a liking report module 204 and a friending report module 206.

The liking report module 204 can record information regarding a liking of a page by a user on the social networking system. The information can include an identifier of the page and an identifier of the user. In some embodiments, the liking report module 204 can record the information based on receipt of the identifier of the page and the identifier of the user. In some embodiments, the identifier of the page can be recorded in a Bloom filter bit vector. The identifier of the user can be recorded as a key associated with the bit vector. Subsequent to recording the identifier of the page in the bit vector, the liking report module 204 can use the propagation module 106 to remove any previously-generated belief that the user will like the page.

The liking report module 204 can also provide previously-recorded information regarding all pages that have been liked by a given user in the past. In some embodiments, the information can be a Bloom filter bit vector for which an identifier of the given user is a key. Further, the liking report module 204 can provide an indication as to whether or not a given user has liked a particular page in the past. In providing the indication, the liking report module 204 can access a Bloom filter bit vector for which an identifier of the given user is a key.

In some embodiments, the liking report module 204 can perform a preprocessing operation. In particular, for each of one or more users, the liking report module 204 can request from the social networking system indication of pages which have been liked by the user. Subsequently, the liking report module 204 can record information regarding pages liked by the user, as discussed.

Moreover, in some embodiments, a Bloom filter bit vector for a user can be maintained in offline memory. In these embodiments, the liking report module 204 can copy the bit vector into local memory prior to: 1) recording information regarding a liking of a page by the user; and 2) providing previously-recorded information regarding a liking of a page by the user. Subsequently, the bit vector as held in local memory can be removed. When recording the information regarding the liking of the page by the user, an identifier of the page can firstly be recorded in the bit vector as held in local memory. Subsequently, the identifier of the page can be recorded in the bit vector as held in offline memory.

The friending report module 206 can record information regarding a friending of a second user of the social networking system by a first user of the social networking system. The information can include an identifier of the second user, and an identifier of the first user. In some embodiments, the friending report module 206 can record the information based on receipt of the identifier of the second user and the identifier of the first user. The identifier of the second user can be recorded in a list, such as an array. The identifier of the first user can be recorded as a key associated with the list. In some embodiments, when recording information regarding the friending of the second user by the first user, the friending report module 206 can also record information for the second user. In particular, the friending report module 206 can record a friending of the first user by the second user, as discussed.

The friending report module 206 can also provide previously-recorded information regarding all users who have been friended by a given user in the past. The previously-recorded information can include identifiers of those users. Further, the friending report module 206 can provide an indication as to whether or not a given user has friended a particular other user in the past. In providing the information or the indication, the friending report module 206 can access a list for which an identifier of the given user is a key.

In some embodiments, the friending report module 206 can perform a preprocessing operation. In particular, for each of one or more users, the friending report module 206 can request from the social networking system indication of other users who have been friended by the user. Subsequently, the friending report module 206 can record information regarding the other users friended by that user, as discussed.

Also, in some embodiments a list for a user can be maintained in offline memory. In these embodiments, the friending report module 206 can copy the list into local memory prior to: 1) recording information regarding a friending of a second user by a first user; and 2) providing previously-recorded information regarding users who have been friended by a given user. Subsequently, the list as held in local memory can be removed. When recording the information regarding the friending of the second user by the first user, an identifier of the second user can firstly be recorded in the list as held in local memory. Later, the identifier of the second user can be recorded in the list as held in offline memory.

Figure 3:
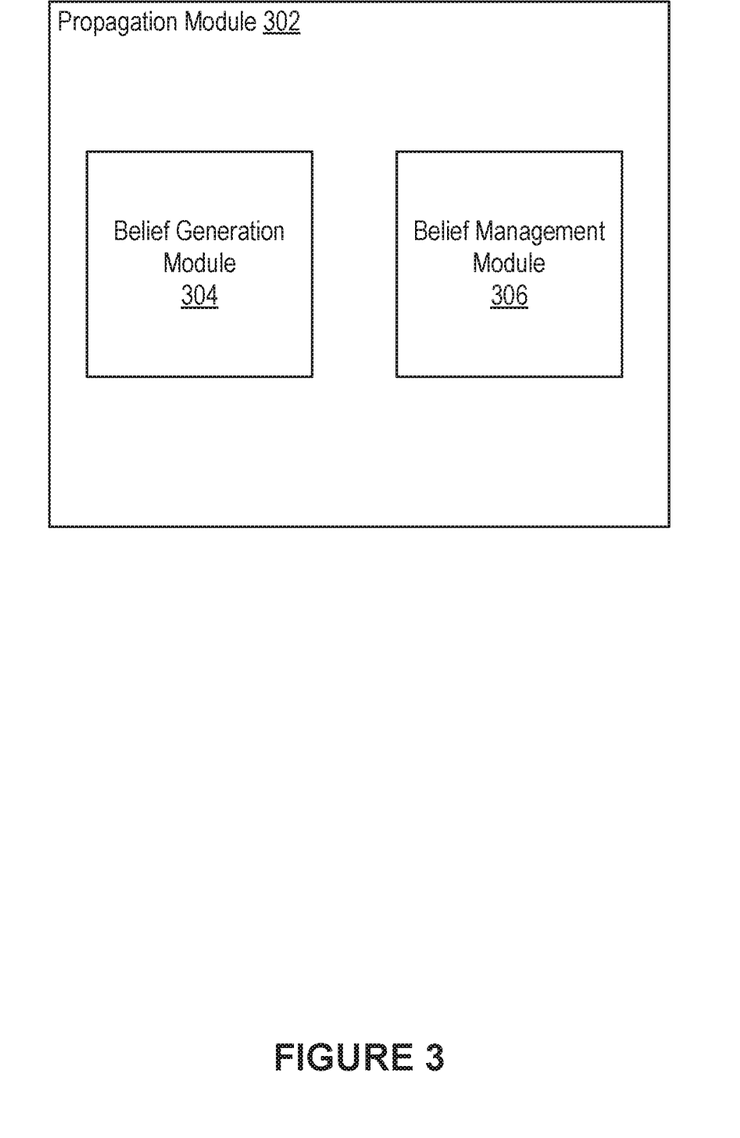
FIG. 3 illustrates an example propagation module, according to an embodiment of the present technology.

FIG. 3 illustrates an example propagation module 302, according to an embodiment of the present technology. In some embodiments, the propagation module 106 of FIG. 1 can be implemented as the example propagation module 302. As shown in FIG. 3, the propagation module 302 can include a belief generation module 304 and a belief management module 306.

The belief generation module 304 can generate a belief that a first user will interact with an item. The item can be, for example, a page or a user. The interaction can be, for example, a friending or a liking. The belief generation module 304 can generate the belief subsequent to a second user interacting with the item. In some embodiments the belief generation module 304 can generate the belief based on receipt of an identifier of the item, an identifier of the first user, and an identifier of the second user. The belief generation module 304 can use the report module 104 to determine whether an interaction with the item has been previously recorded for the first user. Where the belief generation module 304 determines that the interaction with the item has been previously recorded, the belief generation module 304 does not proceed further with the generation of the belief. Where the belief generation module 304 determines that the interaction with the item has not been previously recorded, the belief generation module 304 can proceed further with the generation of the belief.

The belief generation module 304 can use the report module 104 to receive information regarding items with which the first user has interacted in the past. Likewise, the belief generation module 304 can use the report module 104 to receive information regarding items with which the second user has interacted in the past. Where the belief generation module 304 is generating a belief that the first user will like a page, the past items for the first user and the second user can be pages. In this circumstance, the belief generation module 304 can receive the information regarding the past interactions of the first user and the second user as Bloom filter bit vectors. Where the belief generation module 304 is generating a belief that the first user will friend a user, the past items for the first user and the second user can be users. In this circumstance, the belief generation module 304 can receive the information regarding the past interactions of the first user and the second user as lists. Moreover, where there is an existing belief that the first user will interact with the item, the belief generation module 304 can retrieve the existing belief.

Next, the belief generation module 304 can perform the generation of the belief that the first user will interact with the item with which the second user has interacted. In particular, the belief generation module 304 can use: 1) the information regarding those items with which the first user has interacted in the past; 2) the information regarding those items with which the second user has interacted in the past; and 3) the existing belief (where there is an existing belief). In some embodiments, the belief generation module 304 can perform the generation using the calculation:

$$\lambda \cdot \text{existingItemInteractionBelief} + (1-\lambda) \cdot \text{sim}(\text{firstUserPastItemInteractions}, \text{secondUserPastItemInteractions}) \quad (1)$$

existingItemInteractionBefief can be the existing belief. Where there is no existing belief, a zero can be placed. firstUserPastItemInteractions can be the information regarding those items with which the first user has interacted in the past. secondUserPastItemInteractions can be the information regarding those items with which the second user has interacted in the past. sim( ) can be a similarity function, for example a cosine similarity function. $\lambda$ can be a discounting factor. For example, $\lambda$ can be a value ranging between 0 and 1.

After performing the generation of the belief that the first user will interact with the item with which the second user has interacted, the belief generation module 304 can record the belief. In particular, the belief and an identifier associated with the item can be recorded in a list, such as an array. An identifier of the first user can be a key for the list. Were the item is a page, the belief can join in the list any beliefs, generated by the belief generation module 304 in the past, that the first user will like various pages on the social networking system. Further, where the item is a user, the belief can join in list any beliefs, generated by the belief generation module 304 in the past, that the first user will friend various other users of the social networking system. In some embodiments, the beliefs of the list can be normalized. As an example, the beliefs of the list can each be scaled to a value ranging between 0 and 1. For instance, each belief of the list can be scaled by a denominator equal to a sum of the beliefs of the list.

In some embodiments, the belief generation module 304 can use an existing belief that a second user will interact with an item to generate a further belief. The further belief can be a belief that a first user will interact with the item. The item can be a page or a user. The interaction can be a friending or a liking. In generating the further belief, where there is an existing belief that the first user will interact with the item, the belief generation module 304 can access the existing belief. Also in generating the further belief, the belief generation module 304 can use: 1) the information regarding those items with which the first user has interacted in the past, as discussed; 2) the information regarding those items with which the second user has interacted in the past, as discussed; 3) the existing belief that the first user will interact with the item (where there is an existing belief); and 4) the existing belief that the second user will interact with the item. In some embodiments, the belief generation module 304 can perform the generation using the calculation:

$$\lambda \cdot \text{firstUserExistingItemInteractionBelief} + (1-\lambda) \cdot \text{secondUserExistingItemInteractionBelief} \cdot \text{sim}(\text{firstUserPastItemInteractions}, \text{secondUserPastItemInteractions}) \quad (2)$$

firstUserExistingItemInteractionBelief can be the existing belief that the first user will interact with the item. Where there is no existing belief that the first user will interact with the item, a zero can be placed. secondUserExistingItemInteractionBelief can be the existing belief that the second user will interact with the item. firstUserPastItemInteractions can be the information regarding those items with which the first user has interacted in the past. secondUserPastItemInteractions can be the information regarding those items with which the second user has interacted in the past. sim( ) can be a similarity function, as discussed. $\lambda$ can be discounting factor, as discussed. After performing the generation of the belief that belief that the first user will interact with the item, the belief generation module 304 can record the belief, as discussed.

The belief generation module 304 can also provide previously generated beliefs. As one example, for a given user, the belief generation module 304 can provide all beliefs regarding likes which the belief generation module 304 has generated for that user. As another example, for the given user, the belief generation module 304 can provide all beliefs regarding friendings which the belief generation module 304 has generated for that user. In particular, the belief generation module 304 can provide: 1) identifiers of the various items for which the beliefs have been generated; and 2) the beliefs. Further, for a given user and a specified item, the belief generation module 304 can provide a previously-generated belief that the user will interact with the item. In addition, the belief generation module 304 can delete a previously-generated belief for a specified user and a specified item. The belief generation module 304 can access a list of beliefs for which an identifier of the user is a key.

In some embodiments, a list of beliefs for a user can be maintained in offline memory. In these embodiments the belief generation module 304 can copy the list into local memory prior to: 1) recording a generated belief in the list; and 2) providing one or more generated beliefs. Subsequently, the list as held in local memory can be removed. When recording a belief, the belief and a corresponding item identifier can firstly be recorded in the list as held in local memory. Later, the belief and the corresponding item identifier can be recorded in the list as held in offline memory.

The belief management module 306 can use the belief generation module 304 to perform a checkpoint write operation. As one example of the checkpoint write operation, the belief management module 306 can use the belief generation module 304 to receive previously-generated beliefs that various users will like various pages of the social networking system. As another example of the checkpoint write operation, the belief management module 306 can use the belief generation module 304 to receive previously-generated beliefs that various users will friend various other users of the social networking system. Subsequent to receiving the previously-generated beliefs, the belief management module 306 can write the beliefs to a store.

The belief management module 306 can also perform a checkpoint restore operation. As discussed, the belief generation module 304 can hold beliefs for users in lists. In the checkpoint restore operation, the belief management module 306 can read from the store beliefs which were written to the store during a checkpoint write operation. Subsequently, the belief management module 306 can write the beliefs to the lists. As examples, the belief management module 306 can perform the checkpoint restore operation subsequent to a restart or update.

In some embodiments, the beliefs which are generated by the belief generation module 304 can be stored using an approximate priority queue. The approximate priority queue can be implemented by the belief management module 306. As such, the belief management module 306 can monitor an amount of memory utilized in storing the beliefs which are generated by the belief generation module 304. In particular, the belief management module 306 can monitor for the amount of utilized memory meeting a threshold (or threshold value). If the threshold is met, the belief management module 306 can allow certain beliefs to be selected for removal.

As a first example, certain beliefs can be selected for removal when two conditions are met: 1) an initial belief is generated for a user; and 2) a threshold number of users having previously-generated beliefs has been met. In this example, the belief management module 306 can use a priority queue approach to assign priorities to users for whom the belief generation module 304 has generated beliefs. The belief management module 306 can remove from the memory those beliefs for a user who has a lowest assigned priority. As such, memory can be freed for storage of beliefs for the user who has received the initial belief.

As another example, a belief can be selected for removal when two conditions are met: 1) a new belief is generated for a user for whom there are previously-generated beliefs; and 2) a threshold number of previously-generated beliefs for the user has been met. In this example, the belief management module 306 can use a priority queue approach to assign priorities to the previously-generated beliefs. The belief management module 306 can remove from the memory a lowest-priority belief of the previously-generated beliefs. As such, memory can be freed for storage of the new belief.

In some embodiments, the belief management module 306 can periodically use the belief generation module 304 to generate beliefs that first users of the social networking system will interact with various items of the social networking system. The various items can be items for which there are previously-generated beliefs. The previously-generated beliefs can be beliefs that second users, who have friended the first users, will interact with the items. As such, the previously-generated beliefs for the second users can be propagated to the first users. In particular, the previously-generated beliefs can be propagated to the first users as beliefs that the first users will interact with the items.

Figure 4:
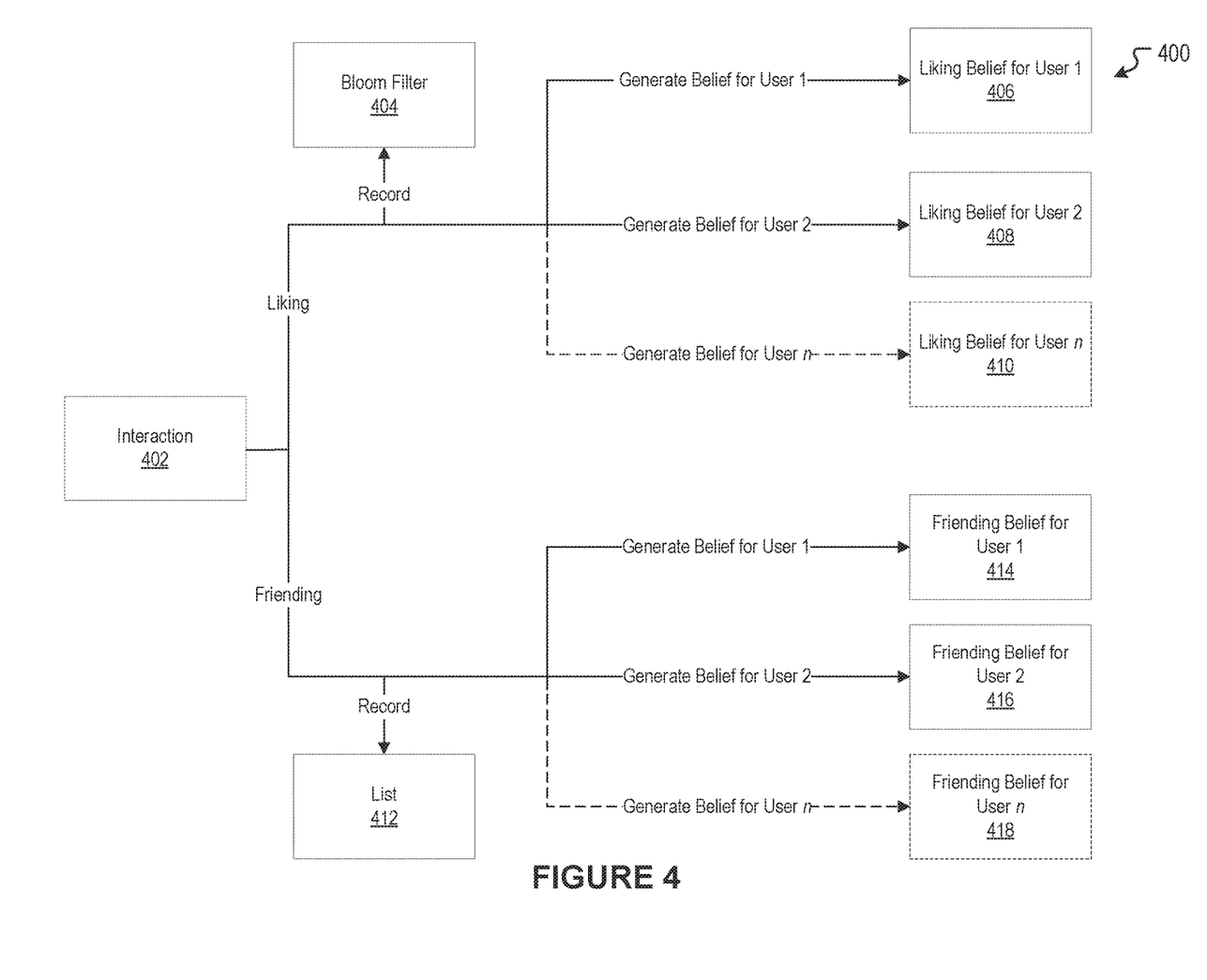
FIG. 4 illustrates an example functional block diagram, according to an embodiment of the present technology.

FIG. 4 illustrates an example functional block diagram 400, according to an embodiment of the present technology. The functional block diagram 400 illustrates an example of operation of the belief learning module 102, as discussed in further detail above. At block 402, an interaction between a user of the social networking system and an item of the social networking system can occur. A determination can be made as to other users 1-$n$ who have been friended by the user in the past. Subsequently, a determination can be made as to whether the interaction is a liking of a given page, or a friending of a given user.

Subsequently, where the interaction is determined to be a liking of a given page, the liking can be recorded in a Bloom filter at block 404. Further, as shown in block 406, block 408, and block 410, for each of the other users 1-$n$ a belief can be generated. The belief can regard whether the other user will like the given page. As such, knowledge of the liking of block 402 can be propagated to the other users 1-$n$ as beliefs that the other users 1-$n$ will like the given page. In some embodiments, the beliefs generated for the users 1-$n$ can be compared to a threshold (or threshold value). In these embodiments, where the belief generated for a particular one of the users 1-$n$ meets the threshold, the given page can be indicated to the particular user as a page recommendation. Where the interaction is determined to be a friending of a given user, the friending can be recorded in a list at block 412. Further, as shown in block 414, block 416, and block 418, for each of the other users 1-$n$ a belief can be generated. The belief can regard whether the other user will friend the given user. As such, knowledge of the friending of block 402 can be propagated to the other users 1-$n$ as beliefs that the other users will friend the given user. In some embodiments, the beliefs generated for the users 1-$n$ can be compared to a threshold (or threshold value). In these embodiments, where the belief for a particular one of the users 1-$n$ meets the threshold, the given user can be indicated to the particular user as a friend recommendation.

Figure 5:
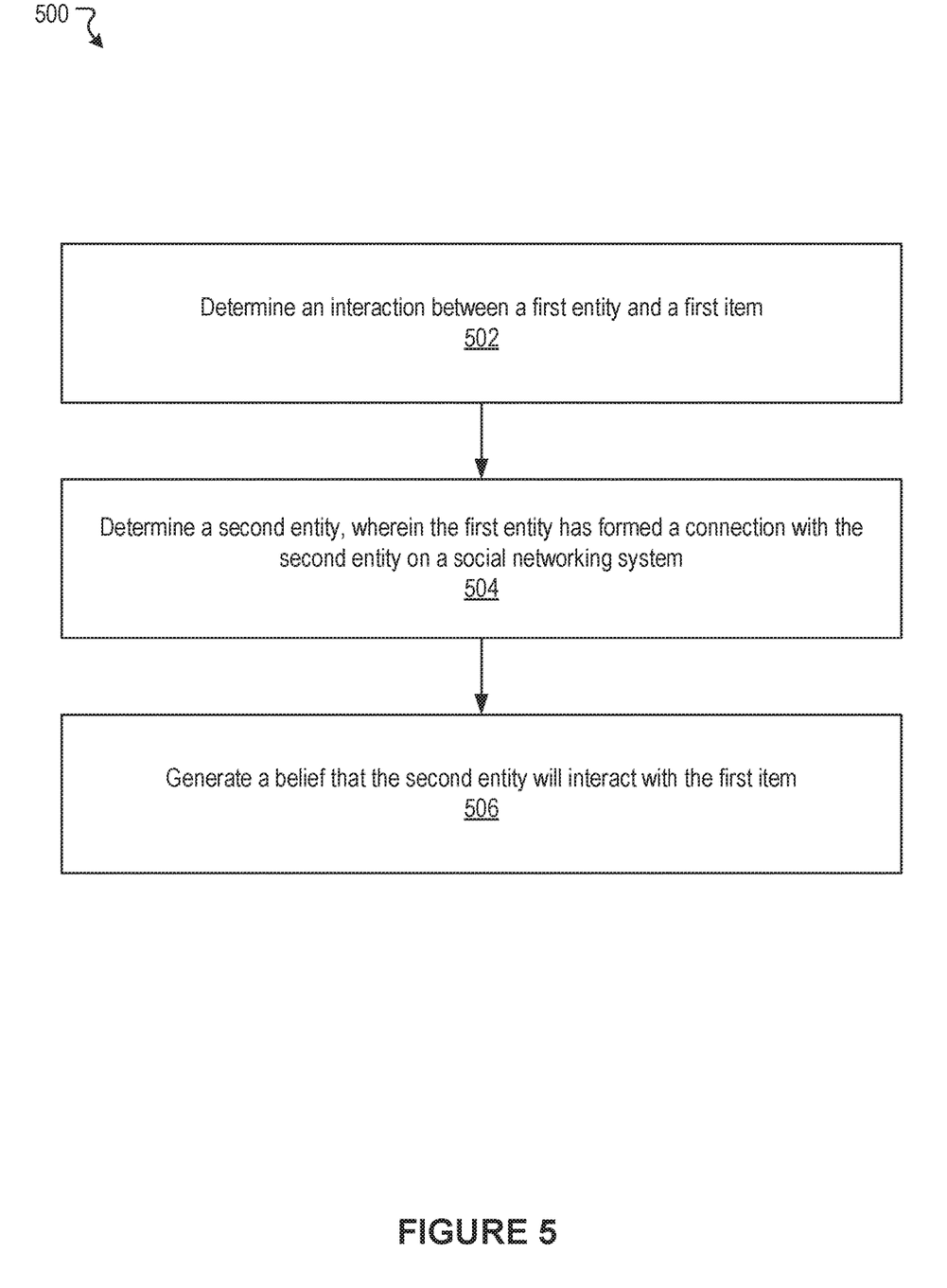
FIG. 5 illustrates an example process, according to an embodiment of the present technology.

FIG. 5 illustrates an example process 500, according to various embodiments of the present technology. It should be appreciated that there can be additional, fewer, or alternative steps performed in similar or alternative orders, or in parallel, within the scope of the various embodiments discussed herein unless otherwise stated.

At block 502, the example process 500 can determine an interaction between a first entity and a first item. At block 504, the process can determine a second entity, wherein the first entity has formed a connection with the second entity on a social networking system. Then, at block 506, the process can generate a belief that the second entity will interact with the first item.

It is contemplated that there can be many other uses, applications, and/or variations associated with the various embodiments of the present technology. For example, in some cases, user can choose whether or not to opt-in to utilize the present technology. The present technology can also ensure that various privacy settings and preferences are maintained and can prevent private information from being divulged. In another example, various embodiments of the present technology can learn, improve, and/or be refined over time.

Social Networking System—Example Implementation

Figure 6:
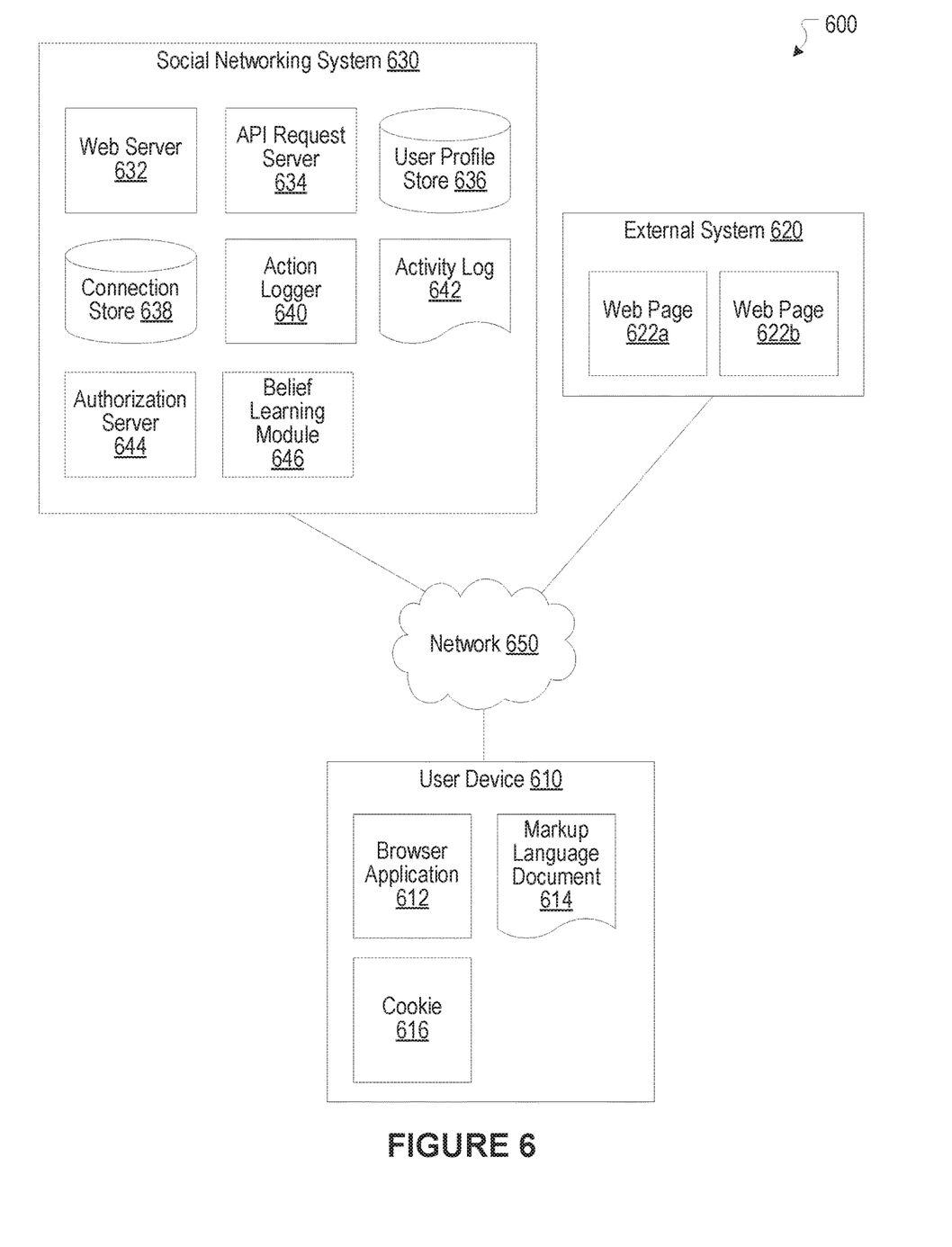
FIG. 6 illustrates a network diagram of an example system including an example social networking system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622*a*, 622*b*, which are communicated to the user device 610 using the network 650. The external system 620 is separate from the social networking system 630. For example, the external system 620 is associated with a first domain, while the social networking system 630 is associated with a separate social networking domain. Web pages 622*a*, 622*b*, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects an other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music, or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list." External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a belief learning module 646. The belief learning module 646 can, for example, be implemented as the belief learning module 102 of FIG. 1. In some embodiments, some or all of the functionality and modules of the belief learning module 646 (e.g., sub modules of the belief learning module 102) instead can be implemented in the user device 610.

Hardware Implementation

Figure 7:
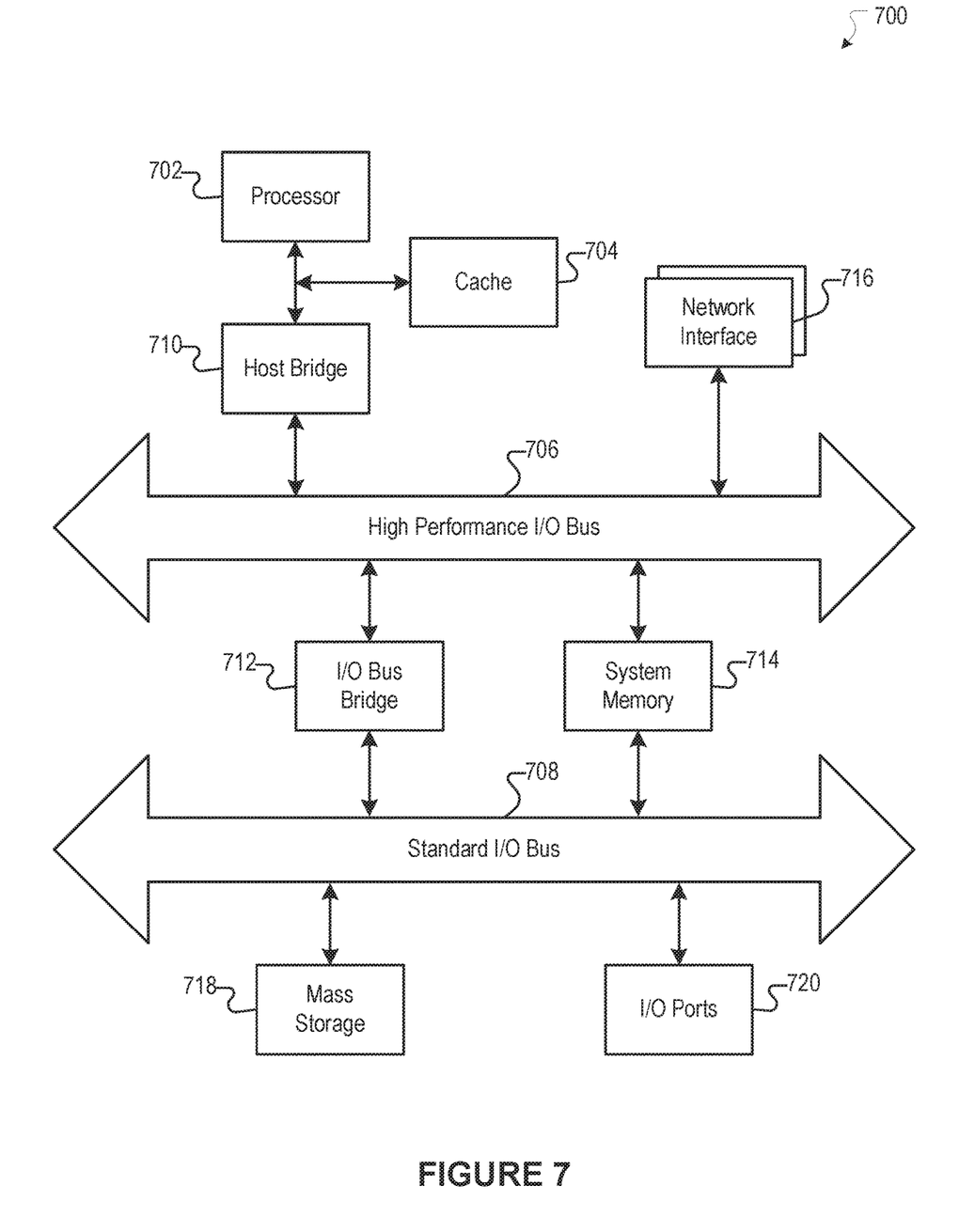
FIG. 7 illustrates an example of a computer system or computing device that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module," with processor 702 being referred to as the "processor core." Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs." For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the technology. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the embodiments of the invention are intended to be illustrative, but not limiting, of the scope of the invention, which is set forth in the following claims.

What is claimed is:

1. A computer-implemented method comprising:
   determining, by a computing system, an interaction between a first entity and a first item based on a first list of interactions recorded for the first entity;
   determining, by the computing system, a second entity has formed a connection with the first entity;
   generating, by the computing system, a belief in a list of beliefs that the second entity will interact with the first item based on the first list of interactions recorded for the first entity and a second list of interactions recorded for the second entity, wherein the generating comprises:
   determining, by the computing system, the second entity has not previously interacted with the first item;
   determining, by the computing system, a prior belief generated for the first entity that the first entity will interact with the first item; and
   determining, by the computing system, a similarity between the first entity and the second entity based on the first list of interactions and the second list of interactions, wherein the similarity is weighted based on the prior belief; and providing, by the computing system, a recommendation for the second entity via a display of a device associated with the second entity.

2. The computer-implemented method of claim 1, wherein the first entity is a first user.

3. The computer-implemented method of claim 1, wherein the second entity is a second user provided as a recommendation to the first entity based on the list of beliefs.

4. The computer-implemented method of claim 1, wherein the recommendation for the second entity is provided based on a satisfaction of a threshold value by the belief.

5. The computer-implemented method of claim 1, further comprising:
determining, by the computing system, a likelihood the first item includes inaccurate content based on a satisfaction of a threshold value by the belief.

6. The computer-implemented method of claim 1, wherein the generating the belief that the second entity will interact with the first item is based on a similarity between the first entity and the second entity.

7. The computer-implemented method of claim 1, wherein the generating the belief that the second entity will interact with the first item is based on an existing belief that the second entity will interact with the first item.

8. The computer-implemented method of claim 1, wherein the list of beliefs is maintained in local memory associated with the first entity.

9. The computer-implemented method of claim 1, wherein the interaction between the first entity and the first item is recorded in a Bloom filter.

10. The computer-implemented method of claim 1, wherein a previously-generated belief in the list of beliefs is removed based on at least one of: a threshold number of beliefs or a threshold memory.

11. A system comprising:
at least one processor; and
a memory storing instructions that, when executed by the at least one processor, cause the system to perform:
determining an interaction between a first entity and a first item based on a first list of interactions recorded for the first entity;
determining a second entity has formed a connection with the first entity;
generating a belief in a list of beliefs that the second entity will interact with the first item based on the first list of interactions recorded for the first entity and a second list of interactions recorded for the second entity, wherein the generating comprises:
determining the second entity has not previously interacted with the first item;
determining a prior belief generated for the first entity that the first entity will interact with the first item; and
determining a similarity between the first entity and the second entity based on the first list of interactions and the second list of interactions, wherein the similarity is weighted based on the prior belief; and
providing a recommendation for the second entity via a display of a device associated with the second entity.

12. The system of claim 11, wherein the instructions, when executed by the at least one processor, further cause the system to perform:
determining the interaction between the first entity and the first item to be a liking of a page.

13. The system of claim 11, wherein the instructions, when executed by the at least one processor, further cause the system to perform:
determining the interaction between the first entity and the first item to be a friending of a third entity.

14. The system of claim 13, wherein the third entity is a user.

15. The system of claim 11, wherein the interaction between the first entity and the first item is a posting of inaccurate content, wherein the first entity is a first page, wherein the second entity is a second page, and wherein the instructions, when executed by the at least one processor, further cause the system to perform:
determining the second page to have a potential to post inaccurate content.

16. A non-transitory computer-readable storage medium including instructions that, when executed by at least one processor of a computing system, cause the computing system to perform a method comprising:
determining an interaction between a first entity and a first item based on a first list of interactions recorded for the first entity;
determining a second entity has formed a connection with the first entity; and
generating a belief in a list of beliefs that the second entity will interact with the first item based on the first list of interactions recorded for the first entity and a second list of interactions recorded for the second entity, wherein the generating comprises:
determining the second entity has not previously interacted with the first item;
determining a prior belief generated for the first entity that the first entity will interact with the first item; and
determining a similarity between the first entity and the second entity based on the first list of interactions and the second list of interactions, wherein the similarity is weighted based on the prior belief; and
providing a recommendation for the second entity via a display of a device associated with the second entity.

17. The non-transitory computer-readable storage medium of claim 16, wherein the instructions, when executed by the at least one processor of the computing system, further cause the computing system to perform:
generating a belief that the second entity will interact with a second item.

18. The non-transitory computer-readable storage medium of claim 17, wherein the generating the belief that the second entity will interact with the second item is based on an existing belief that the first entity will interact with the second item.

19. The non-transitory computer-readable storage medium of claim 17, wherein the generating the belief that the second entity will interact with the second item is performed when generating the belief that the second entity will interact with the first item.

20. The non-transitory computer-readable storage medium of claim 17, wherein the generating the belief that the second entity will interact with the second item is performed as a periodic operation.

* * * * *